Oct. 17, 1939.　　　E. M. PETERSON　　　2,176,408
FROZEN CONFECTION AND ART OF MAKING THE SAME
Filed July 24, 1935　　　2 Sheets-Sheet 1
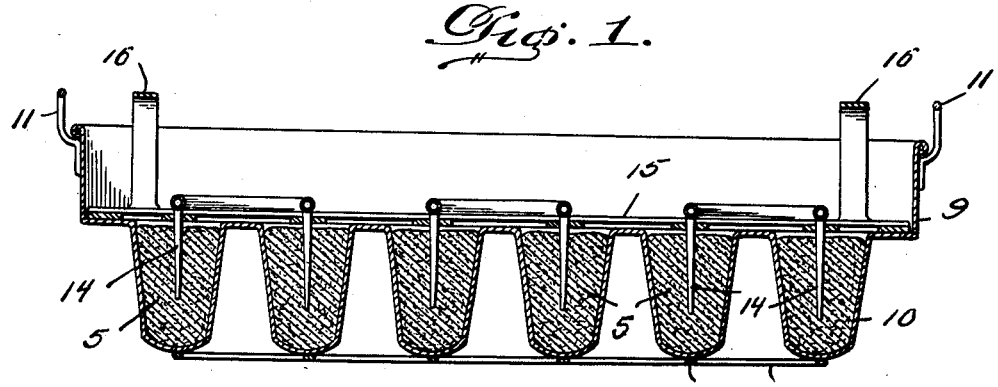
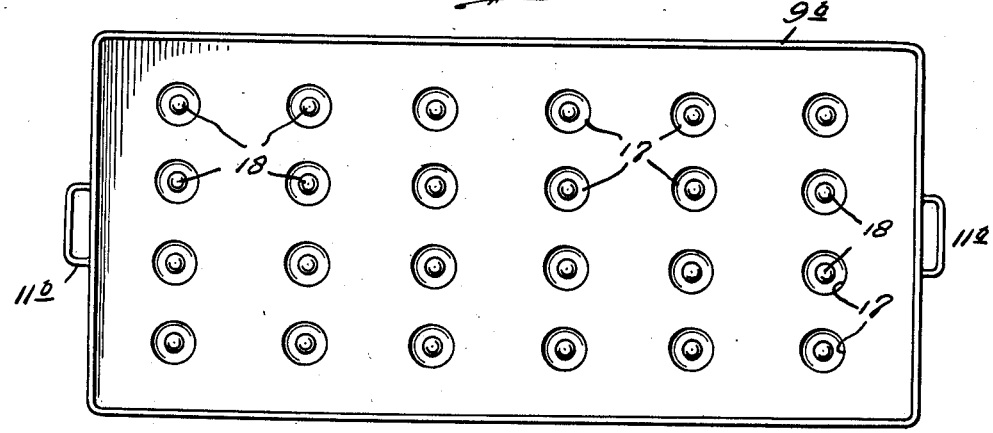
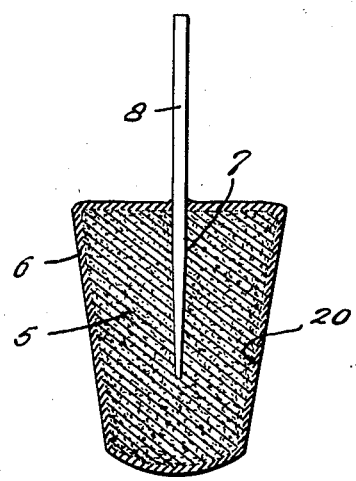
Inventor
Ezra M. Peterson,
By J. Stanley Burch
Attorney

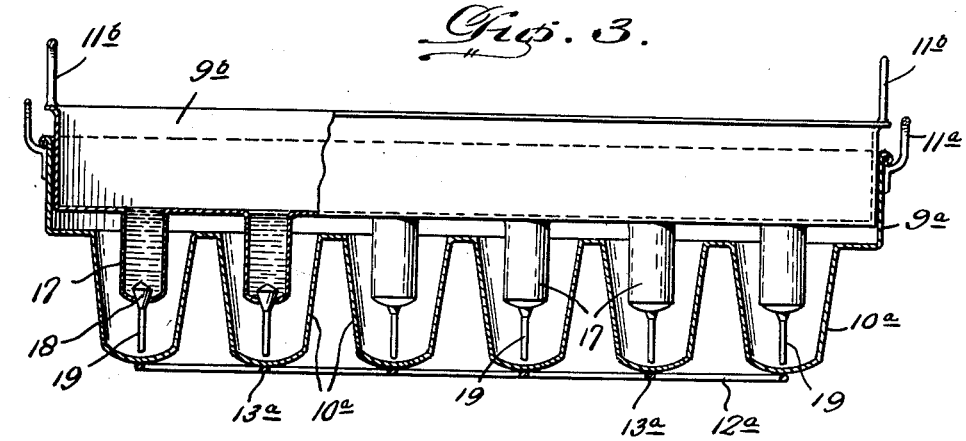
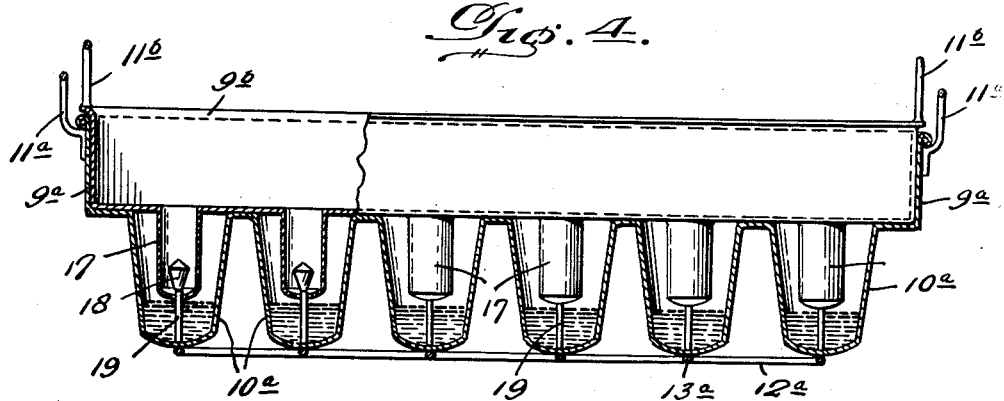
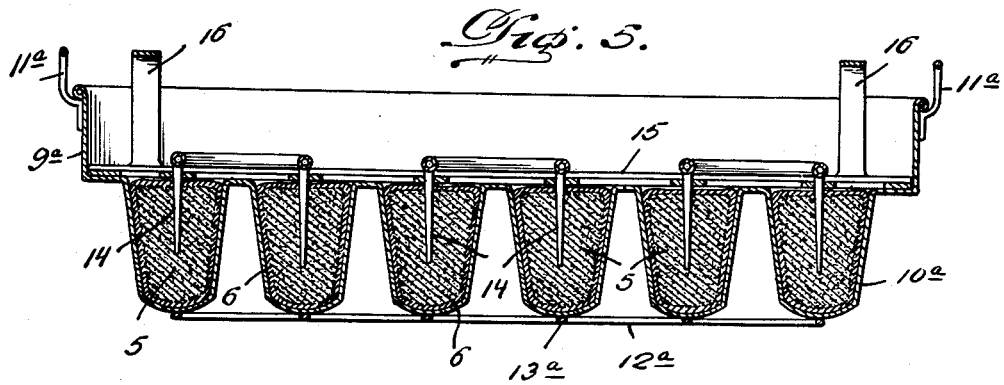

Patented Oct. 17, 1939

2,176,408

UNITED STATES PATENT OFFICE 2,176,408

FROZEN CONFECTION AND ART OF MAKING THE SAME

Ezra Moroni Peterson, Ogden, Utah

Application July 24, 1935, Serial No. 32,945

3 Claims. (Cl. 99—137)

This invention relates to frozen confections of that kind consisting of a body of ice cream or other frozen liquid provided with a chocolate or like coating.

In the manufacture of frozen confections of the above kind, as heretofore practiced, the ice cream or like frozen bodies have been immersed or dipped in the chocolate or like coating substance, after which the coating was simply allowed to harden on the ice cream or other frozen body. Confections so made have been found objectionable for the reason that the coating melts very quickly, and cracks and readily flakes off of the ice cream or like body when the confection is being eaten or consumed.

An important object of the present invention, therefore, is to provide an improved confection of the above kind in which the coating is pressed and frozen onto the ice cream or like body and thereby firmly adhered or bonded to the latter, so that such coating will not melt quickly and will not readily crack and flake off of the ice cream or like body while the confection is being eaten or consumed.

Another important object of the present invention is to provide an improved process of and apparatus for making the improved frozen confection described above.

The apparatus of the present invention includes a mold having a cavity conforming in shape to the shape of the ice cream or like body to be coated, but of a size slightly larger than the size of such ice cream or like body, and means for sustaining and centering said ice cream or like body in the mold cavity, whereby, when the ice cream or like body is centered into the mold cavity with a predetermined quantity of coating substance previously placed in such mold cavity, said coating substance will be forced upwardly on the sides and over the top of the ice cream or like body to coat the latter. Thus, the coating substance will be forced into the material of the ice cream or other frozen body at the surface of the latter for being effectively adhered or bonded to said ice cream or like body when the latter and its coating is subsequently subjected to refrigeration while in the mold.

Another object of the present invention is to provide simple and efficient means for readily placing the proper measured quantity of coating substance in the mold cavity prior to introduction of the ice cream or like body in such cavity for being coated.

Other objects and features of the present invention will become apparent from the following description, when considered in connection with the accompanying drawings, in which:

Figure 1 is a central longitudinal sectional view of a device for molding the ice cream or like bodies of a plurality of frozen confection, in carrying out the present invention.

Figure 2 is a top plan view of a device forming part of the present invention and adapted for depositing measured quantities of coating substance in the mold cavities of a molding and coating device which also forms part of the present invention.

Figure 3 is a view partly in elevation and partly broken away and in section, showing the coating and molding device of the present invention with the coating substance depositing device of Figure 2 operatively associated therewith, said depositing device being in the position which it assumes immediately prior to opening of its valves for releasing the coating substance into the mold cavities of the coating and molding device.

Figure 4 is a view similar to Figure 3 with the depositing device fully lowered, showing the valves of the depositing device open and the coating substance deposited in the mold cavities of the coating and molding device.

Figure 5 is a view similar to Figure 1, showing the molding and coating device of Figures 3 and 4 with the depositing device removed and with the ice cream or frozen bodies of Figure 1 inserted in the mold cavities of said coating and molding device, the ice cream or like frozen bodies being carried by the sustaining means forming part of the device of Figure 1 and by means of which the ice cream or like frozen bodies are centered in the mold cavities of said coating and molding device, and the coating substance being shown as forced upwardly on the sides and over the tops of the ice cream or like frozen bodies; and Figure 6 is a longitudinal section of an improved frozen confection made in accordance with the present invention.

Referring more in detail to the drawings, the present invention is particularly illustrated in connection with the manufacture of frozen confections including an ice cream or like frozen body 5 having a chocolate or equivalent coating 6 and provided with a central bore 7 in which is inserted one end of a stick 8 by means of which the confection may be conveniently held while being eaten or consumed.

In carrying out the present invention, apparatus is employed including a molding device of the type disclosed in my U. S. Letters Patent No. 1,881,965 granted October 11, 1932, upon "Apparatus for making frozen confections". As disclosed in this patent, such molding device is employed for molding a plurality of ice cream or like frozen bodies 5, each of which is to form the body of a frozen confection of the kind above described and illustrated in Figure 6. As generally illustrated in Figure 1, such molding device consists of a pan-like receptacle 9 having a plurality of molds 10 rigid with and depending from the bottom thereof, said molds opening into the receptacle 9 through openings in the bottom of the latter. The receptacle 9 is preferably provided with suitable end handles 11, and the molds 10 may be suitably connected and braced by longitudinal and transverse rods 12 and 13 secured to the bottoms of the molds. Obviously, the molds 10 are adapted to be filled with a liquid substance to be frozen therein whereby the frozen bodies 5 are produced.

Means is provided to sustain and simultaneously remove all of the frozen bodies 5 from the molds 10, and such means may consist of a plurality of fingers 14 rigid with and depending from a frame 15, said fingers 14 being arranged so that one of the same is centrally entered into each of the molds 10 when the frame 15 is placed within the receptacle 9 and upon the bottom of the latter. The frame 15 is of a size to snugly fit within the pan or receptacle 9, and has a pair of handles 16 to facilitate lifting and carrying of the same. This sustaining device for the frozen bodies is of course positioned in place within the receptacle 9 before the material in the molds 10 is frozen to form the bodies 5. Obviously, after the material in the molds 10 has been frozen to produce the bodies 5, the latter may be loosened from the walls of the molds by immersing the latter in warm water. The frozen bodies 5 may then all be lifted from the molds 10 by simply lifting the frame 15, said frozen bodies 5 remaining on the fingers 14.

Pursuant to the above described operation, the frame 15, with the attached frozen bodies 5 are transferred to a coating and molding device of the form shown in Figures 3, 4 and 5, and consisting of a pan-like receptacle 9a having a plurality of molds 10a rigid with and depending from the bottom thereof, said molds opening into receptacle 9a through openings in the bottom of the latter. The receptacle 9a has end handles 11a and the molds 10a may be braced by rods 12a and 13a. The only difference between the construction of the receptacle and mold portions of the molding device of Figure 1 and the construction of the coating and molding device thus described, is that the molds 10a are slightly larger than the molds 10, so that when the frame 15, with the frozen bodies 5 on the fingers 14 of said frame 15, is inserted in the receptacle 9a and upon the bottom of the latter, the said frozen bodies 5 will be centered in and disposed in slight uniformly spaced relation to the walls of the cavities of said molds 10a. However, before the frame 15 with the attached frozen bodies 5 are transferred to the coating and molding device as thus described, the molds 10a of said coating and molding device have predetermined quantities of chocolate or other liquid coating deposited therein. For the purpose of facilitating this deposit of predetermined or measured quantities of coating substance in the molds 10a, I provide the improved depositing device shown in Figures 2 to 4 inclusive and comprising a pan-like receptacle 9b of a size to be snugly removably inserted in the receptacle 9a, and provided with a plurality of depending chambers 17 provided with bottom outlet openings normally closed by gravity seated valves 18. The chambers 17 are rigid with the bottom of receptacle 9b and are arranged so that when receptacle 9b is placed in receptacle 9a one of said chambers 17 will centrally enter the upper portion of each mold 10a. Also, the gravity seated valves 18 have depending stems 19 arranged to engage the bottoms of the molds 10a for unseating said valves 18 when the bottom of receptacle 9b engages the bottom of receptacle 9a. The chocolate or other liquid coating substance in the chambers 17a is thus allowed to flow from the latter into the lower portions of the molds 10a as shown in Figure 4, and as the chambers 17 are of a similar and predetermined size, a predetermined or measured quantity of the coating substance will be deposited in said molds 10a. The chambers 17 may be filled by simply pouring sufficient coating substance in the receptacle 9b to fill all of said chambers 17 as illustrated in Figure 3, and the receptacle 9b has end handles 11b to facilitate lifting and carrying the same.

When the liquid coating substance has been deposed in the molds 10a as shown in Figure 4, the depositing device is removed, and the frame 15 with the attached frozen bodies 5 is placed in the molding and coating device as shown in Figure 5. As the frozen bodies 5 enter the molds 10a, the liquid coating substance previously deposited in said molds 10a is forced upwardly on the sides and over the top of the frozen bodies 5 so as to completely coat the latter, the quantity of coating substance deposited in each mold 10a being just sufficient to completely coat the frozen body positioned in that mold. The frozen bodies and the coatings thereof are then suitably subjected to refrigeration so that the coatings are frozen onto the bodies 5 for being effectively adhered or bonded to the latter as indicated by the dotted lines at 20 in Figure 6. This bonding effect is had because the coating substance is forced up the sides of the frozen bodies and confined thereagainst during the final freezing operation, and it will be apparent that the coatings will not readily melt and will not readily crack and flake off while the confection is being eaten or consumed.

After the coatings have been frozen on the frozen bodies 5 while in the molds 10a, such coated frozen bodies may be removed from the molds 10a by simply lifting them, together with the frame 15 out of the coating and molding device, the confections having been previously suitably loosened from the walls of molds 10a or by some means having been prevented from adhering to the latter. The coated frozen bodies are then removed from the fingers 14 and placed in suitable containers or wrappers, whereupon the handle-forming stick 8 may be inserted in the cavity or bore 7 formed in each confection by one of the fingers 14. If desired, means may be provided for heating the fingers 14 to facilitate removal of the coated confections therefrom, as generally described in my above-mentioned U. S. Letters Patent. The stick 8 is of course maintained in a cold condition until it is inserted in the bore 7, whereby it will not soften the frozen body about said bore and thereby enlarge the latter.

From the foregoing description, it is believed that the nature and advantages of the present invention will be readily understood and appreciated by those skilled in the art. Also, while I have described what is at present believed to be the preferred embodiment of the devices constituting the apparatus of the present invention, it will be understood that minor changes may be made in the details thereof as illustrated and described, without departing from the spirit and scope of the invention as claimed.

What I claim as new is:

1. A frozen confection including an ice cream or like body devoid of surface projections and having a chocolate or equivalent coating thereon frozen and pressure bonded thereto.

2. A frozen confection comprising an ice cream or like frozen body devoid of surface projections and provided with a bore, a handle-forming stick inserted in said bore, and a chocolate or equivalent coating on said body completely covering the latter and surrounding the stick at one end of said body, said coating being frozen and pressure bonded to said body so as to not readily flake off of the latter.

3. A frozen confection comprising an ice cream or like frozen body, and a coating of edible material on said frozen body, said coating being frozen and pressure-bonded onto said frozen body.

EZRA MORONI PETERSON.